(12) United States Patent
Wu et al.

(10) Patent No.: US 10,933,704 B2
(45) Date of Patent: Mar. 2, 2021

(54) TIRE PRESSURE POSITIONING METHOD AND APPARATUS

(71) Applicant: AUTEL INTELLIGENT TECHNOLOGY CORP., LTD., Guangdong (CN)

(72) Inventors: Yong Wu, Guangdong (CN); Fusheng Lei, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 47 days.

(21) Appl. No.: 16/260,884

(22) Filed: Jan. 29, 2019

(65) Prior Publication Data
US 2019/0152278 A1 May 23, 2019

Related U.S. Application Data

(63) Continuation of application No. PCT/CN2016/093528, filed on Aug. 5, 2016.

(51) Int. Cl.
*B60C 23/04* (2006.01)

(52) U.S. Cl.
CPC .......... *B60C 23/0489* (2013.01); *B60C 23/04* (2013.01); *B60C 23/0488* (2013.01)

(58) Field of Classification Search
CPC .. B60C 23/0489; B60C 23/04; B60C 23/0488
See application file for complete search history.

(56) References Cited

U.S. PATENT DOCUMENTS

| | | | |
|---|---|---|---|
| 6,204,758 B1 | 3/2001 | Wacker et al. | |
| 7,425,892 B2 | 9/2008 | Mori et al. | |
| 2006/0247847 A1* | 11/2006 | Carter | G06Q 10/08 701/498 |

(Continued)

FOREIGN PATENT DOCUMENTS

| | | |
|---|---|---|
| CN | 101835638 A | 9/2010 |
| CN | 103009940 A | 4/2013 |

(Continued)

OTHER PUBLICATIONS

Extended European Search Report dated Jan. 21, 2020; Appln. No. 16911294.3.

*Primary Examiner* — Joseph H Feild
*Assistant Examiner* — Rufus C Point

(57) ABSTRACT

The present application provides a tire pressure positioning method and apparatus. The method includes: obtaining turning information used to indicate turning of a vehicle; obtaining a y-axis acceleration of a tire pressure sensor in a tire of the vehicle, where a y-axis is an axial direction parallel to a wheel bearing; and determining a position of the tire pressure sensor according to the turning information and the y-axis acceleration. Information about the y-axis acceleration of the tire pressure sensor is processed. Compared with a method in the prior art in which information about an x-axis acceleration and information about a z-axis acceleration need to be processed simultaneously, the method can reduce a data processing amount, thereby simplifying data collection and calculation processes and improving system operation efficiency.

13 Claims, 6 Drawing Sheets

(56) References Cited

U.S. PATENT DOCUMENTS

| | | | | |
|---|---|---|---|---|
| 2010/0037714 A1* | 2/2010 | Friske | ................ | G01M 17/022 |
| | | | | 73/865.9 |
| 2010/0256874 A1* | 10/2010 | Carresjo | ............ | G01M 17/013 |
| | | | | 701/48 |
| 2010/0274441 A1* | 10/2010 | Carresjo | ............ | B60C 23/0479 |
| | | | | 701/31.4 |
| 2011/0118968 A1* | 5/2011 | Takenaka | ............ | B62K 11/007 |
| | | | | 701/124 |
| 2014/0002258 A1 | 1/2014 | Chen | | |
| 2014/0107946 A1* | 4/2014 | Kandler | ................ | B60C 11/246 |
| | | | | 702/34 |
| 2016/0214585 A1* | 7/2016 | Keller | ................... | B60T 8/1725 |
| 2017/0210386 A1* | 7/2017 | Kou | ..................... | B60W 30/02 |
| 2018/0257441 A1* | 9/2018 | Maehara | .................. | G01D 5/00 |
| 2019/0080529 A1* | 3/2019 | Saylor | ................. | B60C 23/0488 |
| 2019/0329606 A1* | 10/2019 | Stewart | ............... | B60C 23/0489 |

FOREIGN PATENT DOCUMENTS

| | | |
|---|---|---|
| CN | 103434349 A | 12/2013 |
| CN | 203344662 U | 12/2013 |
| CN | 105480029 A | 4/2016 |
| WO | 2009/049459 A1 | 4/2009 |

\* cited by examiner

TIRE PRESSURE POSITIONING METHOD AND APPARATUS

BACKGROUND

Technical Field

The present application relates to the field of automobile accessory technologies, and in particular, to a tire pressure positioning method and apparatus.

Related Art

A tire pressure monitoring system (TPMS) is a vehicle active safety system that adopts a radio transmission technology, collects data such as a vehicle tire acceleration, pressure and a temperature by using a highly sensitive micro wireless tire pressure sensor fixed inside a vehicle tire in a moving state or a static state, sends the data to a host in a cab, displays the related data such as the vehicle tire pressure and the temperature in a digital form in real time and warns a driver in manners such as buzzing and audio when a tire is abnormal.

Generally, there are four existing tire pressure sensors, which are respectively installed on four wheels of a vehicle. Receiving antennas for performing wireless data transmission with the tire pressure sensors are installed at a front end and a rear end of the vehicle. The receiving antennas are connected to a signal processor. A signal output end of the signal processor is connected to a screen display system in the vehicle. A tire pressure sensor is usually disposed in a tire on a side close to an outside hub and includes a microcontroller, an x-axis acceleration sensor, a y-axis acceleration sensor, a z-axis acceleration sensor, a pressure sensor and a radio transmitter. The x-axis acceleration sensor detects an acceleration of a wheel in a moving direction. The y-axis acceleration sensor detects an acceleration of a wheel in a direction perpendicular to an x-axis on a horizontal plane, that is, the acceleration of the wheel in a bearing direction. The z-axis acceleration sensor detects an acceleration of a wheel in a vertical direction. The tire pressure sensor respectively senses the acceleration of the tire along the x-axis, the acceleration along the y-axis, the acceleration along the z-axis and pressure data by using the x-axis acceleration sensor, the y-axis acceleration sensor, the z-axis acceleration sensor and the pressure sensor, and transmits corresponding data to the host for display.

The Chinese Patent CN103770583A discloses a tire pressure sensor automatic positioning method. First, a corresponding tire pressure sensor in each tire detects an x-axis acceleration change, a z-axis acceleration change and tire pressure data of a corresponding tire to calculate a rotation direction of each tire and sends a calculated result, and an ID of the tire pressure sensor is transmitted by using a radio transmitter. Then, a receiving antenna accepts data transmitted by the radio transmitter and transmits the data to a signal processor; the signal processor determines a left direction and a right direction of a tire according to a forward direction of a vehicle and a turning direction of the corresponding tire, and determines corresponding left and right wheels; subsequently, compares tire signals and/or acceleration signals, where using a position of the receiving antenna as a reference, a stronger signal corresponds to a tire relatively close to the receiving antenna; and finally, transmits corresponding tire pressure data to a screen display system for display.

However, in the tire pressure sensor automatic positioning method, it is set that a driving direction of the vehicle is a positive direction of the x-axis, data indicating that a z-axis acceleration increases and a x-axis acceleration is greater than zero corresponds to a left wheel rotating anti-clockwise, and data indicating that the z-axis acceleration increases and the x-axis acceleration is less than zero corresponds to a right wheel rotating clockwise; or vice versa, thereby effectively identifying a position of the tire corresponding to the corresponding tire pressure sensor ID. In the method, accelerations of tire pressure sensors in both the x-axis direction and the z-axis direction need to be detected simultaneously, and further, it needs to be ensured that the tire pressure sensors include corresponding acceleration sensors in the x-axis direction and the z-axis direction. Consequently, a monitoring apparatus and program processing are relatively complex. Therefore, how to simplify the tire pressure sensor automatic positioning method becomes the problem that urgently needs to be resolved today.

SUMMARY

A technical problem to be resolved in the present application is that in a tire pressure sensor automatic positioning method in the prior art, a monitoring apparatus and program processing are relatively complex due to simultaneous detection on an x-axis acceleration and a z-axis acceleration.

Based thereupon, an embodiment of the present application provides a tire pressure positioning method, including the following steps: obtaining turning information used to indicate turning of a vehicle; obtaining a y-axis acceleration of a tire pressure sensor in a tire of the vehicle, where a y-axis is an axial direction parallel to a wheel bearing; and determining a position of the tire pressure sensor according to the turning information and the y-axis acceleration.

An embodiment of the present application provides a tire pressure sensor positioning method, including the following steps: obtaining y-axis accelerations of tire pressure sensors in tires located on a same side of a vehicle, where there are at least two tire pressure sensors; and determining front-rear positions of the tire pressure sensors according to y-axis acceleration amplitudes of the tire pressure sensors, where a tire pressure sensor having a larger y-axis acceleration amplitude is located in front of a tire pressure sensor having a smaller y-axis acceleration amplitude.

An embodiment of the present application further provides a tire pressure sensor positioning apparatus, including: a turning information obtaining unit, configured to obtain turning information used to indicate turning of a vehicle; a first acceleration obtaining unit, configured to obtain a y-axis acceleration of a tire pressure sensor in a tire of the vehicle, where a y-axis is an axial direction parallel to a wheel bearing; and a position determining unit, configured to determine a position of the tire pressure sensor according to the turning information and the y-axis acceleration.

An embodiment of the present application provides a tire pressure sensor positioning apparatus, including: a second acceleration obtaining unit, configured to obtain y-axis accelerations of tire pressure sensors in tires located on a same side of a vehicle, where there are at least two tire pressure sensors; and a second front-rear position determining unit, configured to determine front-rear positions of the tire pressure sensors according to y-axis acceleration amplitudes of the tire pressure sensors, where a tire pressure sensor having a larger y-axis acceleration amplitude is located in front of a tire pressure sensor having a smaller y-axis acceleration amplitude.

According to the tire pressure positioning method and apparatus that are provided in the embodiments of the present application, turning information used to indicate turning of a vehicle and a y-axis acceleration of a tire pressure sensor in a tire of the vehicle are obtained, to determine the y-axis acceleration of the tire pressure sensor under the turning information. A position of the tire pressure sensor is determined according to the turning information and the y-axis acceleration of the tire pressure sensor. For example, the tire pressure sensor is at a left-front position, a left-rear position, a right-front position or a right-rear position in the vehicle. In the embodiments of the present application, information about the y-axis acceleration of the tire pressure sensor is processed. Compared with a method in the prior art in which information about an x-axis acceleration and information about a z-axis acceleration need to be processed simultaneously, the method can reduce a data processing amount, thereby simplifying data collection and calculation processes and improving system operation efficiency.

An embodiment of the present invention further provides a computer storage medium, storing computer-readable instructions used to implement any tire pressure sensor positioning method provided in the embodiments of the present invention. For example, the instructions include: an instruction of obtaining turning information used to indicate turning of a vehicle; an instruction of obtaining a y-axis acceleration of a tire pressure sensor in a tire of the vehicle, where a y-axis is an axial direction parallel to a wheel bearing; and an instruction of determining a position of the tire pressure sensor according to the turning information and the y-axis acceleration.

An embodiment of the present invention further provides a computer storage medium, storing computer-readable instructions used to implement any tire pressure sensor positioning method provided in the embodiments of the present invention. For example, the instructions include: an instruction of obtaining y-axis accelerations of tire pressure sensors in tires located on a same side of a vehicle, where there are at least two tire pressure sensors; and an instruction of determining front-rear positions of the tire pressure sensors according to y-axis acceleration amplitudes of the tire pressure sensors, where a tire pressure sensor having a larger y-axis acceleration amplitude is located in front of a tire pressure sensor having a smaller y-axis acceleration amplitude.

BRIEF DESCRIPTION OF THE DRAWINGS

To describe technical solutions of specific implementations of the present application more clearly, the flowing further describes the present application in detail according to specific embodiments of the present application and with reference to the accompanying drawings.

DETAILED DESCRIPTION

Technical solutions in the present application are clearly and completely described in the following with reference to the accompanying drawings. Apparently, the embodiments to be described are merely a part rather than all of the embodiments of the present application. All other embodiments obtained by a person of ordinary skill in the art based on the embodiments of the present application without creative efforts shall fall within the protection scope of the present application.

In addition, technical features involved in different implementations of the present application described below can be combined provided that no conflict is constructed between each other.

Embodiment 1

An implementation of a tire pressure sensor positioning method is shown in FIG. 1 to FIG. 4, including the following steps:

S101: Obtain turning information used to indicate turning of a vehicle.

Figure 1:
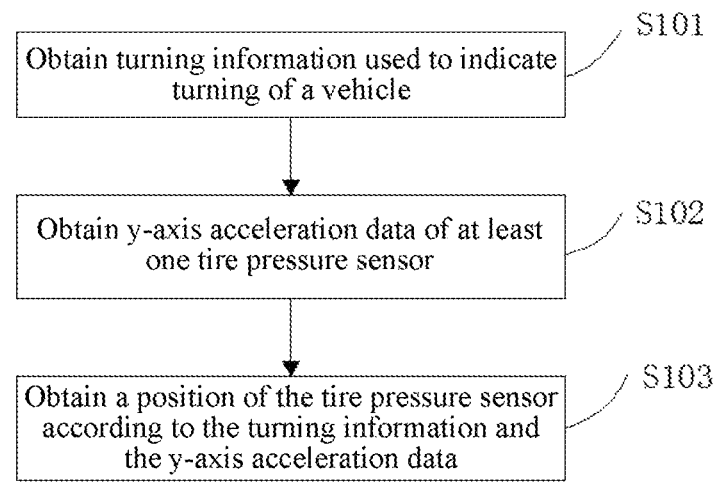
FIG. 1 is a flowchart of an implementation of a tire pressure sensor positioning method according to Embodiment 1 of the present application.
Figure 2:
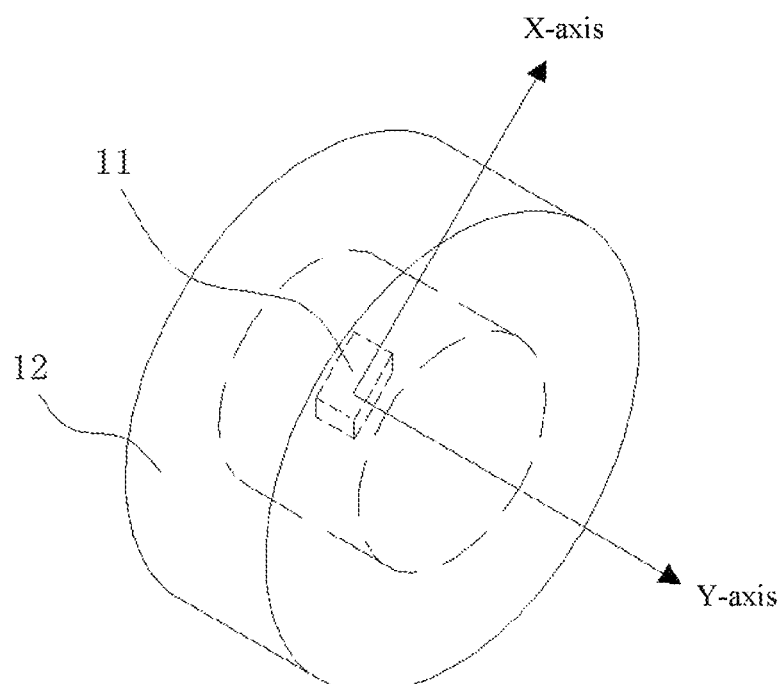
FIG. 2 is a schematic three-dimensional diagram showing that a tire pressure sensor is disposed in a tire according to Embodiment 1 of the present application.
Figure 3:
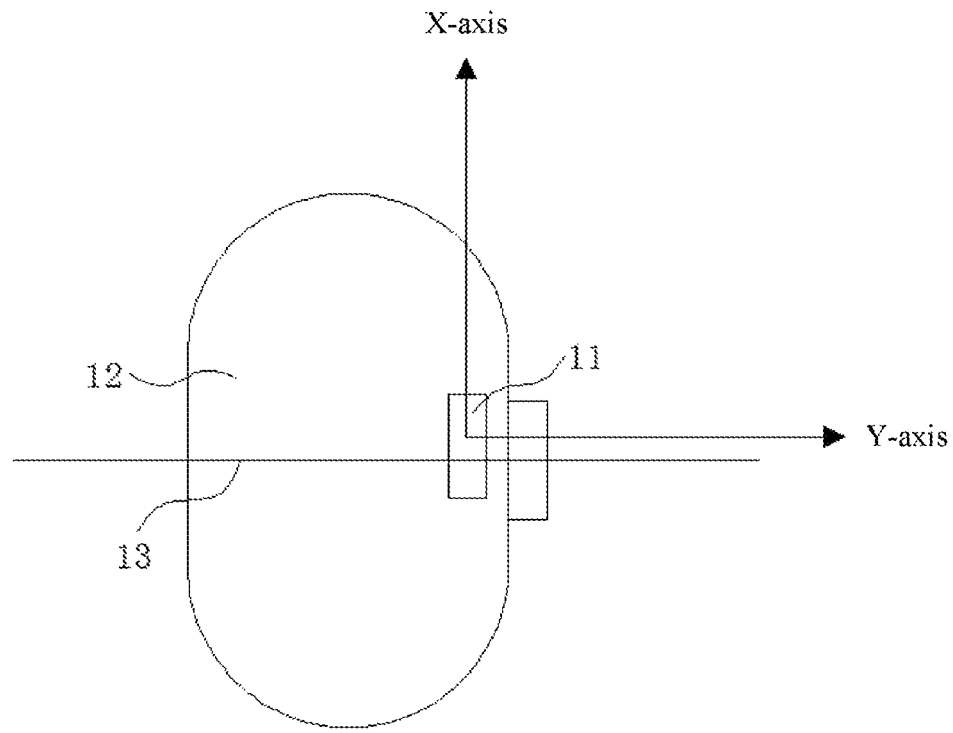
FIG. 3 is a top view of a position relationship between a tire pressure sensor and a tire when the tire is vertically disposed according to Embodiment 1 of present application.

S102: Obtain a y-axis acceleration of a tire pressure sensor 11 in a tire 12 of the vehicle, where a y-axis is an axial direction parallel to a wheel bearing 13, as shown in FIG. 2 and FIG. 3.

S103: Determine a position of the tire pressure sensor 11 according to the turning information and the y-axis acceleration.

According to the tire pressure positioning method, turning information used to indicate turning of a vehicle and a y-axis acceleration of a tire pressure sensor 11 in a tire 12 of the vehicle are obtained, to determine the y-axis acceleration of the tire pressure sensor 11 under the turning information. A position of the tire pressure sensor 11 is determined according to the turning information and the y-axis acceleration of the tire pressure sensor 11. For example, the tire pressure sensor 11 is at a left-front position, a left-rear position, a right-front position or a right-rear position in the vehicle. In this embodiment of the present application, information about the y-axis acceleration of the tire pressure sensor 11 is processed. Compared with a method in the prior art in which information about an x-axis acceleration and information about a z-axis acceleration need to be processed simultaneously, the method can reduce a data processing amount, thereby simplifying data collection and calculation processes and improving system operation efficiency.

In a preferred implementation, step S103 may include: determining, according to a positive direction of the y-axis, positive and negative information of the y-axis acceleration and the turning information, whether the tire pressure sensor 11 is located on a left side or a right side of the vehicle.

Specifically, if the positive direction of the y-axis is a direction facing toward an outer side of the tire 12, when the turning information is turning left and the y-axis acceleration is positive, it is determined that the tire pressure sensor 11 is located on the right side of the vehicle; when the turning information is turning left and the y-axis acceleration is positive, it is determined that the tire pressure sensor 11 is located on the left side of the vehicle; when the turning information is turning right and the y-axis acceleration is positive, it is determined that the tire pressure sensor 11 is located on the left side of the vehicle; and when the turning information is turning left and the y-axis acceleration is positive, it is determined that the tire pressure sensor 11 is located on the right side of the vehicle.

In this case, the positive direction of the y-axis is the direction facing toward the outer side of the tire 12, that is, a positive direction of the y-axis acceleration of the tire pressure sensor 11 on the left side of the vehicle is turning left, and a positive direction of the y-axis acceleration of the tire pressure sensor 11 on the right side of the vehicle is turning right. Therefore, when the vehicle turns left, directions of the y-axis accelerations of the tire pressure sensors 11 on the left side and the right side are actually turning right. In this case, the y-axis acceleration of the tire pressure sensor 11 on the left side is opposite to the set positive direction, which is turning left, of the y-axis, that is, is a negative value; and the y-axis acceleration of the tire pressure sensor 11 on the right side is the same as the set positive direction, which is turning right, of the y-axis, that is, is a positive value. When the vehicle turns right, directions of the y-axis accelerations of the tire pressure sensors 11 on the left side and the right side are actually turning left. In this case, the y-axis acceleration of the tire pressure sensor 11 on the left side is the same as the positive direction, which is turning left, of the y-axis, that is, is a positive value; and the y-axis acceleration of the tire pressure sensor 11 on the right side is opposite to the set positive direction, which is turning right, the y-axis, that is, is a negative value. In this way, whether each tire pressure sensor 11 is located on the left side or the right side of the vehicle may be determined by using the positive and negative information of an acceleration and the turning information, that is, a function of positioning whether the tire pressure sensor 11 is on the left side or the right side of the vehicle is implemented.

If the positive direction of the y-axis is a direction facing toward an inner side of the tire 12, when the turning information is turning left and the y-axis acceleration is positive, it is determined that the tire pressure sensor 11 is located on the left side of the vehicle; when the turning information is turning left and the y-axis acceleration is positive, it is determined that the tire pressure sensor 11 is located on the right side of the vehicle; when the turning information is turning right and the y-axis acceleration is positive, it is determined that the tire pressure sensor 11 is located on the right side of the vehicle; and when the turning information is turning right and the y-axis acceleration is negative, it is determined that the tire pressure sensor 11 is located on the left side of the vehicle.

In this case, the positive direction of the y-axis is the direction facing toward the inner side of the tire 12, that is, a positive direction of the y-axis acceleration of the tire pressure sensor 11 on the left side of the vehicle is turning right, and a positive direction of the y-axis acceleration of the tire pressure sensor 11 on the right side of the vehicle is turning left. Therefore, when the vehicle turns left, directions of the y-axis accelerations of the tire pressure sensors 11 on the left side and the right side are actually turning right. In this case, the y-axis acceleration of the tire pressure sensor 11 on the left side is the same as the set positive direction, which is turning right, of the y-axis, that is, is a positive value; and the y-axis acceleration of the tire pressure sensor 11 on the right side is opposite to the set positive direction, which is turning left, of the y-axis, that is, is a negative value. When the vehicle turns right, directions of the y-axis accelerations of the tire pressure sensors 11 on the left side and the right side are actually turning left. In this case, the y-axis acceleration of the tire pressure sensor 11 on the left side is opposite to the positive direction, which is turning right, of the y-axis, that is, is a negative value; and the y-axis acceleration of the tire pressure sensor 11 on the right side is the same as the set positive direction, which is turning left, the y-axis, that is, is a positive value. In this way, whether each tire pressure sensor 11 is located on the left side or the right side of the vehicle may be determined by using the positive and negative information of an accelerations and the turning information, that is, a function of positioning whether the tire pressure sensor 11 is on the left side or the right side of the vehicle is implemented.

Usually, there are at least two wheels on the left side or the right side of the vehicle. Therefore, there are at least two tire pressure sensors 11 located on a same side of the vehicle, and front-rear positions of the at least two tire pressure sensors 11 need to be determined. In a preferred implementation, step S103 may include: determining front-rear positions of the at least two tire pressure sensors 11 according to y-axis acceleration amplitudes of the at least two tire pressure sensors 11, where a tire pressure sensor 11 of the at least two tire pressure sensors 11 that has a larger y-axis acceleration amplitude is located in front of a tire pressure sensor 11 of the at least two tire pressure sensors 11 that has a smaller y-axis acceleration amplitude.

Figure 4:
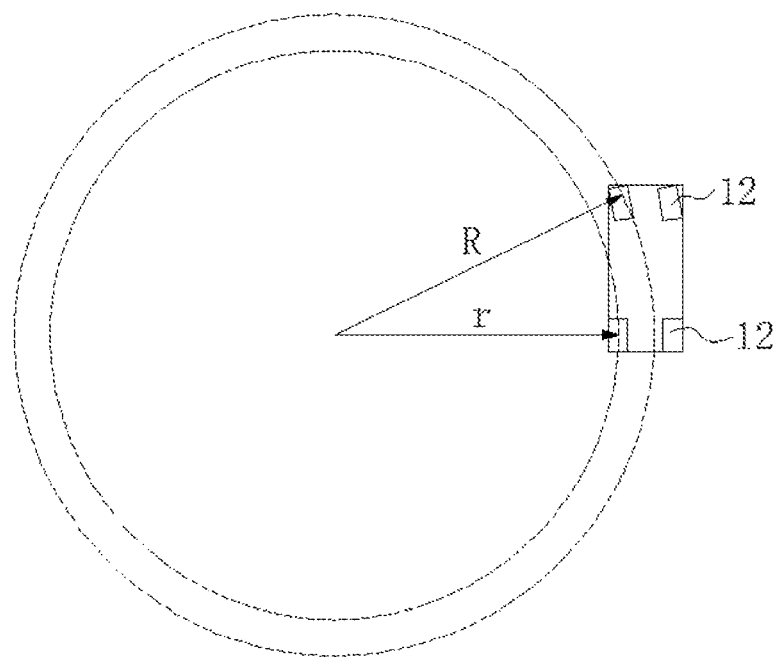
FIG. 4 is an exemplary schematic diagram showing that a vehicle turns left according to Embodiment 1 of the present application.

Because there are at least two tire pressure sensors 11 located on a same side of the vehicle, positions of the tire pressure sensors 11 on the same side are determined. In this case, as shown in FIG. 4, because the vehicle brakes by using front wheels when making a turn, a centrifugal radius R of a c during tuning is greater than a centrifugal radius r of a rear wheel on the same side as the front wheel. In addition, each tire 12 has a same rotation angular velocity, and a y-axis acceleration is in a positive proportion to a turning radius. Therefore, information about front-rear positions of corresponding tire pressure sensors 11 can be determined according to acceleration amplitudes of the at least two tire pressure sensors 11, where a tire pressure sensor 11 of the at least two tire pressure sensors 11 that has a larger y-axis acceleration amplitude is located in front of a tire pressure sensor 11 of the at least two tire pressure sensors 11 that has a smaller y-axis acceleration amplitude, thereby implementing the function of positioning whether a tire pressure sensor 11 is at the front or the rear of the vehicle.

With reference to the foregoing described method for determining whether a tire pressure sensor is located on a left side or a right side, and at the front or the rear of a vehicle, a specific position of a tire pressure sensor 11 can be determined according to turning information and a y-axis acceleration. Specifically, when the turning information is turning left and the positive direction of the y-axis acceleration is a direction facing toward an outer side of the tire 12, or when the turning information is turning right and the positive direction of the y-axis acceleration is a direction facing toward an inner side of the tire 12, tire pressure sensors 11 are sorted in descending order of y-axis accelerations along a clockwise direction, where a tire pressure sensor having a largest y-axis acceleration is located at a right-front position of the vehicle; and when the turning information is turning right and a positive direction of the y-axis acceleration is a direction facing toward an outer side of the tire 12, or when the turning information is turning left and a positive direction of the y-axis acceleration is a direction facing toward an inner side of the tire 12, tire pressure sensors 11 are sorted in descending order of y-axis accelerations along an anti-clockwise direction, where a tire pressure sensor 11 having a largest y-axis acceleration is located at a left-front position of the vehicle.

It should be noted that in a process in which the tire pressure sensors 11 are sorted in descending order of the y-axis accelerations along the clockwise direction, values of the y-axis accelerations each have a positive sign or a negative sign. In addition, values of y-axis acceleration obtained by all tire pressure sensors 11 are compared, that is, the y-axis acceleration each having a positive sign or a negative sign and obtained by all the tire pressure sensors 11 are sorted in descending order, to determine a position of the tire pressure sensor 11 having the largest y-axis acceleration.

Because a centrifugal radius R of a front wheel during turning is greater than a centrifugal radius r of a rear wheel on a same side as the front wheel during turning, an absolute value of a y-axis acceleration of a front tire pressure sensor 11 of a vehicle is greater than an absolute value of a y-axis acceleration of a rear tire pressure sensor 11. When the vehicle turns left, a centrifugal radius of a front or rear tire pressure sensor 11 on a right side of the vehicle is greater than a centrifugal radius of the same front or rear tire pressure sensor 11 on a left side of the vehicle, and therefore, an absolute value of the y-axis acceleration on the right side is greater than an absolute value of the y-axis acceleration on the left side. When the vehicle turns right, a centrifugal radius of a front or rear tire pressure sensor 11 on the left side of the vehicle is greater than a centrifugal radius of the same front or rear tire pressure sensor 11 on the right side of the vehicle, and therefore, an absolute value of the y-axis acceleration on the left side is greater than an absolute value of the y-axis acceleration on the right side.

In addition, a value of a y-axis acceleration may have a positive sign or a negative sign due to different positive directions. When the turning information is turning left and the positive direction of the y-axis acceleration is the direction facing toward the outer side of the tire 12, or when the turning information is turning right and the positive direction of the y-axis acceleration is the direction facing toward the inner side of the tire 12, a largest y-axis acceleration having a positive sign or a negative sign is at a right-front position of the vehicle. When the turning information is turning right and the positive direction of the y-axis acceleration is the direction facing toward the outer side of the tire 12, or when the turning information is turning left and the positive direction of the y-axis acceleration is the direction facing toward the inner side of the tire 12, a largest y-axis acceleration having a positive sign or a negative sign is at a left-front position of the vehicle. In this way, the y-axis accelerations each having a positive sign or a negative sign and obtained by all the tire pressure sensors 11 are sorted in descending order, to determine whether the tire pressure sensor 11 having the largest y-axis acceleration is at the right-front position or the left-front position of the vehicle.

Embodiment 2

Figure 5:
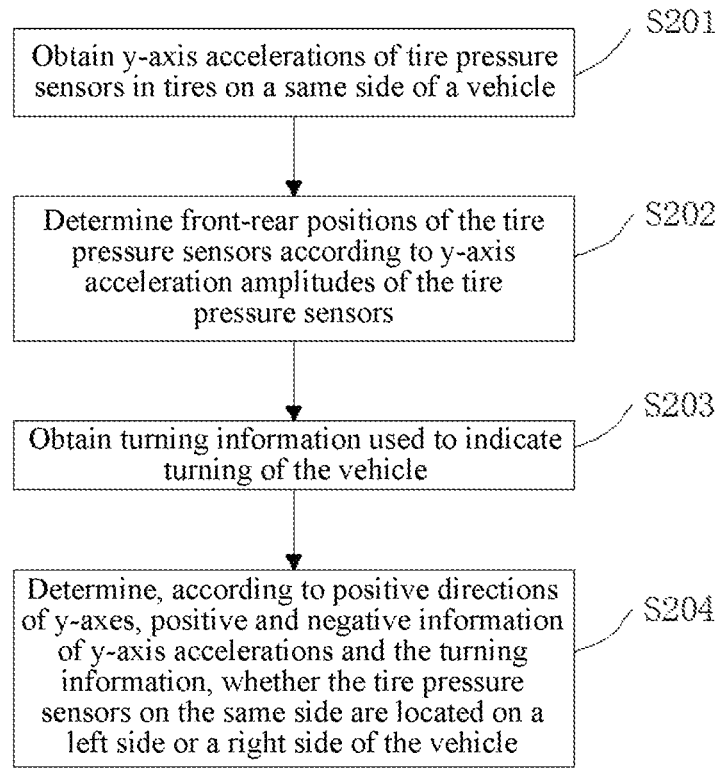
FIG. 5 is a flowchart of another implementation of a tire pressure sensor positioning method according to Embodiment 1 of the present application.

Another implementation of a tire pressure sensor positioning method is shown in FIG. 5, including the following steps:

S201: Obtain y-axis accelerations of tire pressure sensors 11 in tires 12 located on a same side of a vehicle, where there are at least two tire pressure sensors 11.

S202: Determine front-rear positions of the tire pressure sensors 11 according to y-axis acceleration amplitudes of the tire pressure sensors 11, where a tire pressure sensor 11 having a larger y-axis acceleration amplitude is located in front of a tire pressure sensor 11 having a smaller y-axis acceleration amplitude.

According to the foregoing tire pressure sensor positioning method, y-axis accelerations of tire pressure sensors 11 in tires 12 located on a same side of a vehicle are obtained, where there are at least two tire pressure sensors 11. Further, front-rear positions of the tire pressure sensors 11 all on a left side or a right side may be determined according to y-axis acceleration amplitudes. Information about the y-axis accelerations of the tire pressure sensors 11 is processed. Compared with a method in the prior art in which information about an x-axis acceleration and information about a z-axis acceleration need to be processed simultaneously, the method can reduce a data processing amount, thereby simplifying data collection and calculation processes and improving system operation efficiency.

In a preferred implementation, the method further includes the following steps:

S203: Obtain turning information used to indicate turning of the vehicle.

S204: Determine, according to positive directions of y-axes, positive and negative information of y-axis accelerations and the turning information, whether the tire pressure sensors 11 on the same side are located on a left side or a right side of the vehicle.

Compared with the method in Embodiment 1, the tire pressure sensor positioning method also achieves the objective of determining positions of tire pressure sensors 11 in a manner of first determining front-rear positions and then determining left-right positions. In addition, if positive directions of the y-axes are directions facing toward outer sides of tires 12 or positive directions of y-axes are directions facing toward inner sides of tires 12, a determined result is the same as the result in Embodiment 1. For details, refer to descriptions of determining a position of a tire pressure sensor 11 in Embodiment 1 if a positive direction of a y-axis is a direction facing toward an outer side of a tire 12 or a positive direction of a y-axis is a direction facing toward an inner side of a tire 12, and details are not described herein again.

Embodiment 3

Figure 6:
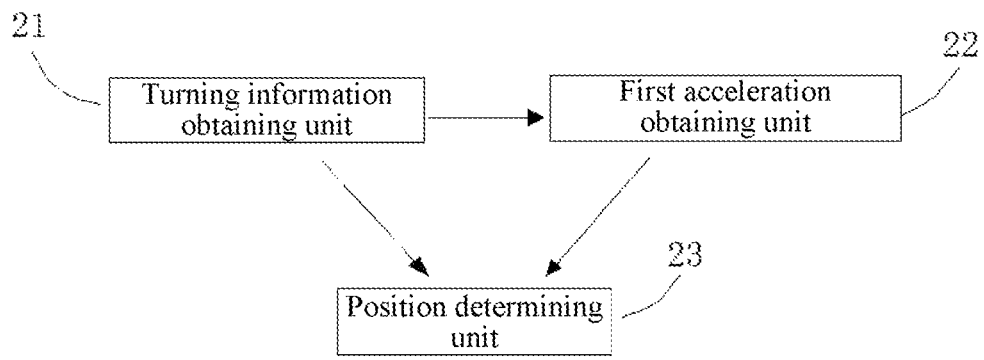
FIG. 6 is a schematic diagram of a tire pressure sensor positioning apparatus according to Embodiment 2 of the present application.

An implementation of a tire pressure sensor positioning apparatus is shown in FIG. 6, including: a turning information obtaining unit 21, a first acceleration obtaining unit 22 and a position determining unit 23. The turning information obtaining unit 21 is configured to obtain turning information used to indicate turning of a vehicle. The first acceleration obtaining unit 22 is configured to obtain a y-axis acceleration of a tire pressure sensor 11 in a tire 12 of the vehicle, where a y-axis is an axial direction parallel to a wheel bearing 13, as shown in FIG. 3. The position determining unit 23 is configured to determine a position of the tire pressure sensor 11 according to the turning information and the y-axis acceleration.

According to the tire pressure positioning apparatus, the turning information obtaining unit 21 obtains the turning information used to turning of the vehicle, and the first acceleration obtaining unit 22 obtains the y-axis acceleration of the tire pressure sensor 11 in the tire 12 of the vehicle, to determine the y-axis acceleration of the tire pressure sensor 11 under the turning information. Then, the position determining unit 23 determines the position of the tire pressure sensor 11 according to the turning information and the y-axis acceleration of the tire pressure sensor 11. For example, the tire pressure sensor 11 is at a left-front position, a left-rear position, a right-front position or a right-rear position in the vehicle. In this embodiment of the present application, information about the y-axis acceleration of the tire pressure sensor 11 is processed. Compared with a method in the prior art in which information about an x-axis acceleration and information about a z-axis acceleration need to be processed simultaneously, the method can reduce a data processing amount, thereby simplifying data collection and calculation processes and improving system operation efficiency.

In a preferred implementation, the position determining unit 23 includes a left-right position determining subunit, configured to determine, according to a positive direction of the y-axis, positive and negative information of the y-axis acceleration and the turning information, whether the tire pressure sensor 11 is located on a left side or a right side of the vehicle.

Specifically, the left-right position determining subunit includes a first determining subunit, a second determining subunit, a third determining subunit and a fourth determining subunit. If the positive direction of the y-axis is a direction facing toward an outer side of the tire 12, the first determining subunit is configured to: when the turning information is turning left and the y-axis acceleration is positive, determine that the tire pressure sensor 11 is located on the right side of the vehicle; the second determining subunit is configured to: when the turning information is turning left and the y-axis acceleration is negative, determine that the tire pressure sensor 11 is located on the left side of the vehicle; the third determining subunit is configured to: when the turning information is turning right and the y-axis acceleration is positive, determine that the tire pressure sensor 11 is located on the left side of the vehicle; and the fourth determining subunit is configured to: when the turning information is turning right and the y-axis acceleration is negative, determine that the tire pressure sensor 11 is located on the right side of the vehicle.

The left-right position determining subunit further includes a fifth determining subunit, a sixth determining subunit, a seventh determining subunit and an eighth determining subunit. If the positive direction of the y-axis is a direction facing toward an inner side of the tire 12, the fifth determining subunit is configured to: when the turning information is turning left and the y-axis acceleration is positive, determine that the tire pressure sensor 11 is located on the left side of the vehicle; the sixth determining subunit is configured to: when the turning information is turning left and the y-axis acceleration is negative, determine that the tire pressure sensor 11 is located on the right side of the vehicle; the seventh determining subunit is configured to: when the turning information is turning right and the y-axis acceleration is positive, determine that the tire pressure sensor 11 is located on the right side of the vehicle; and the eighth determining subunit is configured to: when the turning information is turning left and the y-axis acceleration is negative, determine that the tire pressure sensor 11 is located on the left side of the vehicle.

For implementation principles of the functions of the first determining subunit, the second determining subunit, the third determining subunit and the fourth determining subunit of the left-right position determining subunit, refer to descriptions of determining whether a tire pressure sensor 11 is located on a left side or a right side in Embodiment 1 if a positive direction of a y-axis is a direction facing toward an outer side of a tire 12. In addition, for implementation principles of the functions of the fifth determining subunit, the sixth determining subunit, the seventh determining subunit and the eighth determining subunit of the left-right position determining subunit, refer to descriptions of determining whether a tire pressure sensor 11 is located on a left side or a right side in Embodiment 1 if a positive direction of a y-axis is a direction facing toward an inner side of a tire 12.

Usually, there are at least two wheels on the left side or the right side of the vehicle. Therefore, there are at least two tire pressure sensors 11 located on a same side of the vehicle, and front-rear positions of the at least two tire pressure sensors 11 need to be determined. In a preferred implementation, the position determining unit includes a first front-rear position determining subunit, configured to determine front-rear positions of the at least two tire pressure sensors 11 according to y-axis acceleration amplitudes of the at least two tire pressure sensors 11, where a tire pressure sensor 11 of the at least two tire pressure sensors 11 that has a larger y-axis acceleration amplitude is located in front of a tire pressure sensor 11 of the at least two tire pressure sensors 11 that has a smaller y-axis acceleration amplitude. For implementation of the function of the first front-rear position determining subunit herein, refer to descriptions of determining front-rear positions of at least two tire pressure sensors 11 in Embodiment 1.

The position determining unit 23 includes subunits for determining that the tire pressure sensor is at the left side or the right side and the front or rear of the vehicle, to determine specific positions of the tire pressure sensors 11. In addition, the position determining unit further includes a right-front position determining subunit and a left-front position determining unit. The right-front position determining subunit is configured to: when the turning information is turning left and a positive direction of the y-axis acceleration is a direction facing toward an outer side of the tire 12, or when the turning information is turning right and a positive direction of the y-axis acceleration is a direction facing toward an inner side of the tire 12, sort tire pressure sensors 11 in descending order of y-axis accelerations along a clockwise direction, where the right-front position determining subunit determines that a tire pressure sensor 11 having a largest y-axis acceleration is located at a right-front position of the vehicle. The left-front position determining subunit is configured to: when the turning information is turning right and a positive direction of the y-axis acceleration is a direction facing toward an outer side of the tire 12, or when the turning information is turning left and a positive direction of the y-axis acceleration is a direction facing toward an inner side of the tire 12, sort tire pressure sensors 11 in descending order of y-axis accelerations along an anti-clockwise direction, where the left-front position determining unit determines that a tire pressure sensor 11 having a largest y-axis acceleration is located at a left-front position of the vehicle.

For implementation of the functions of the right-front position determining subunit and the left-front position determining unit, refer to descriptions of determining a right-front position and a left-front position in Embodiment 1, and details are not described herein again.

Embodiment 4

In another implementation of a tire pressure sensor positioning apparatus, the tire pressure sensor positioning apparatus includes a second acceleration obtaining unit and a second front-rear position determining unit. The second acceleration obtaining unit is configured to obtain y-axis accelerations of tire pressure sensors 11 in tires 12 located on a same side of a vehicle, where there are at least two tire pressure sensors 11. The second front-rear position determining unit is configured to determine front-rear positions of the tire pressure sensors 11 according to y-axis acceleration amplitudes of the tire pressure sensors 11, where a tire pressure sensor 11 having a larger y-axis acceleration amplitude is located in front of a tire pressure sensor 11 having a smaller y-axis acceleration amplitude.

According to the foregoing tire pressure sensor positioning apparatus, the second acceleration obtaining unit 22 obtains the y-axis accelerations of the tire pressure sensors 11 in the tires 12 located on the same side of the vehicle, where there are at least two tire pressure sensors 11. Further, the second front-rear position determining unit may determine the front-rear positions of the tire pressure sensors 11 on a same left side or a same right side according to the y-axis acceleration amplitudes. Information about the y-axis accelerations of the tire pressure sensors 11 is processed. Compared with an apparatus in the prior art that information about an x-axis acceleration and information about a z-axis acceleration need to be processed simultaneously, the apparatus can reduce a data processing amount, thereby simplifying data collection and calculation processes and improving system operation efficiency.

In a preferred implementation, the tire pressure sensor positioning apparatus further includes a turning information obtaining unit and left-right position determining unit. The turning information obtaining unit is configured to obtain turning information used to indicate turning of a vehicle. The left-right position determining unit is configured to determine, according to positive directions of y-axes, positive and negative information of the y-axis accelerations and the turning information, whether the tire pressure sensors (11) on the same side are located on a left side or a right side of the vehicle. Compared with the implementation in Embodiment 3, this embodiment is merely for tire pressure sensors 11 in tires 12 on a same side of a vehicle and a case in which there are at least two tire pressure sensors 11. In addition, the functions and implementations of the left-right position determining unit and the left-right position determining subunit in Embodiment 3 are the same. For details, refer to descriptions of the left-right position determining subunit in Embodiment 3.

Embodiment 5

Figure 7:
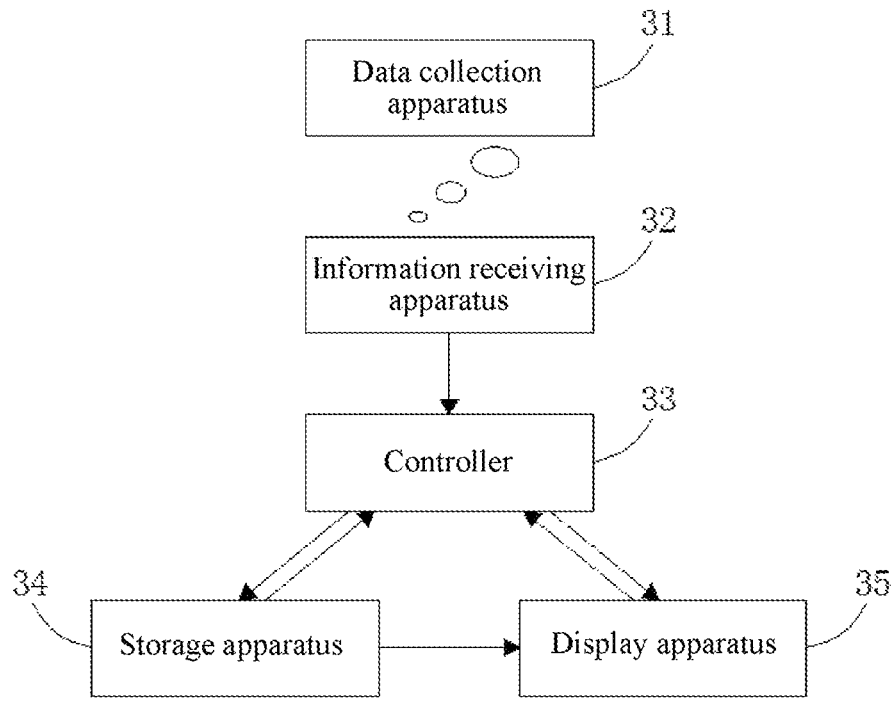
FIG. 7 is a schematic diagram of a tire pressure sensor positioning system according to Embodiment 3 of the present application.

Referring to FIG. 7, this embodiment provides a tire pressure sensor positioning system. Referring to FIG. 3 and FIG. 7, the tire pressure sensor positioning system includes a data collection apparatus 31, an information receiving apparatus 32 and a controller 33. The data collection apparatus 31 is configured to collect turning information used to indicate turning of a vehicle and a y-axis acceleration of a tire pressure sensor 11 in a tire 12 of the vehicle, where a y-axis is an axial direction parallel to a wheel bearing 13. The information receiving apparatus 32 exchanges data with the data collection apparatus 31 and is configured to receive the turning information and the y-axis acceleration that are sent by the data collection apparatus 31. The controller 33 is connected to the information receiving apparatus 32 and is configured to execute a program to implement any method in Embodiment 1 and Embodiment 2.

According to the tire pressure sensor positioning system, the data collection apparatus 31 collects turning information used to indicate turning of the vehicle and a y-axis acceleration of the tire pressure sensor 11 in the tire 12 of the vehicle. The information receiving apparatus 32 exchanges data with the data collection apparatus 31. The controller 33 is connected to the information receiving apparatus 32 and is configured to execute a program to implement any method in Embodiment 1 and Embodiment 2, thereby positioning the tire pressure sensor 11. In addition, the tire pressure sensor positioning system has a relatively low requirement on the tire pressure sensor 11 in the collection apparatus, and a positioning function can be implemented by detecting the y-axis acceleration, thereby reducing costs of the positioning system.

In a preferred implementation, the tire pressure sensor positioning system further includes a storage apparatus 34 and/or a display apparatus. The storage apparatus 34 is configured to store data sent by the controller 33. The display apparatus 35 is configured to display data sent by the controller 33.

Figure 8:
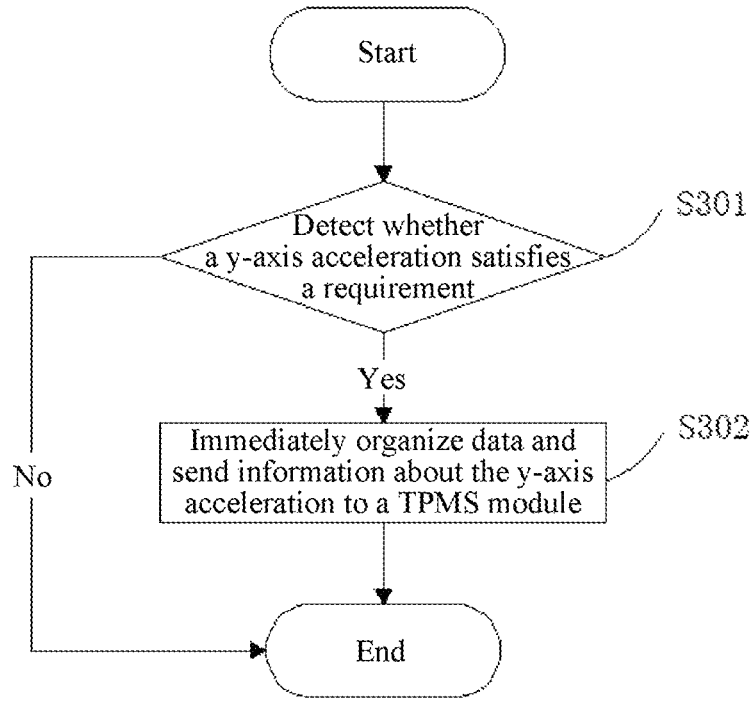
FIG. 8 is a flowchart of a program of a tire pressure sensor of a tire pressure sensor positioning system according to Embodiment 3 of the present application.

Specifically, the controller 33 includes a TPMS module. After processing and analyzing detected data, the tire pressure sensor 11 sends information about the y-axis acceleration satisfying a requirement to the TPMS module. As shown in FIG. 8, a program of the tire pressure sensor 11 may include the following procedures:

S301: Detect whether the y-axis acceleration satisfies the requirement, and when the y-axis acceleration satisfies the requirement, perform step S302, or when the y-axis acceleration does not satisfy the requirement, end this turn of detection operations.

S302: Immediately organize data and send the information about the y-axis acceleration to the TPMS module.

Figure 9:
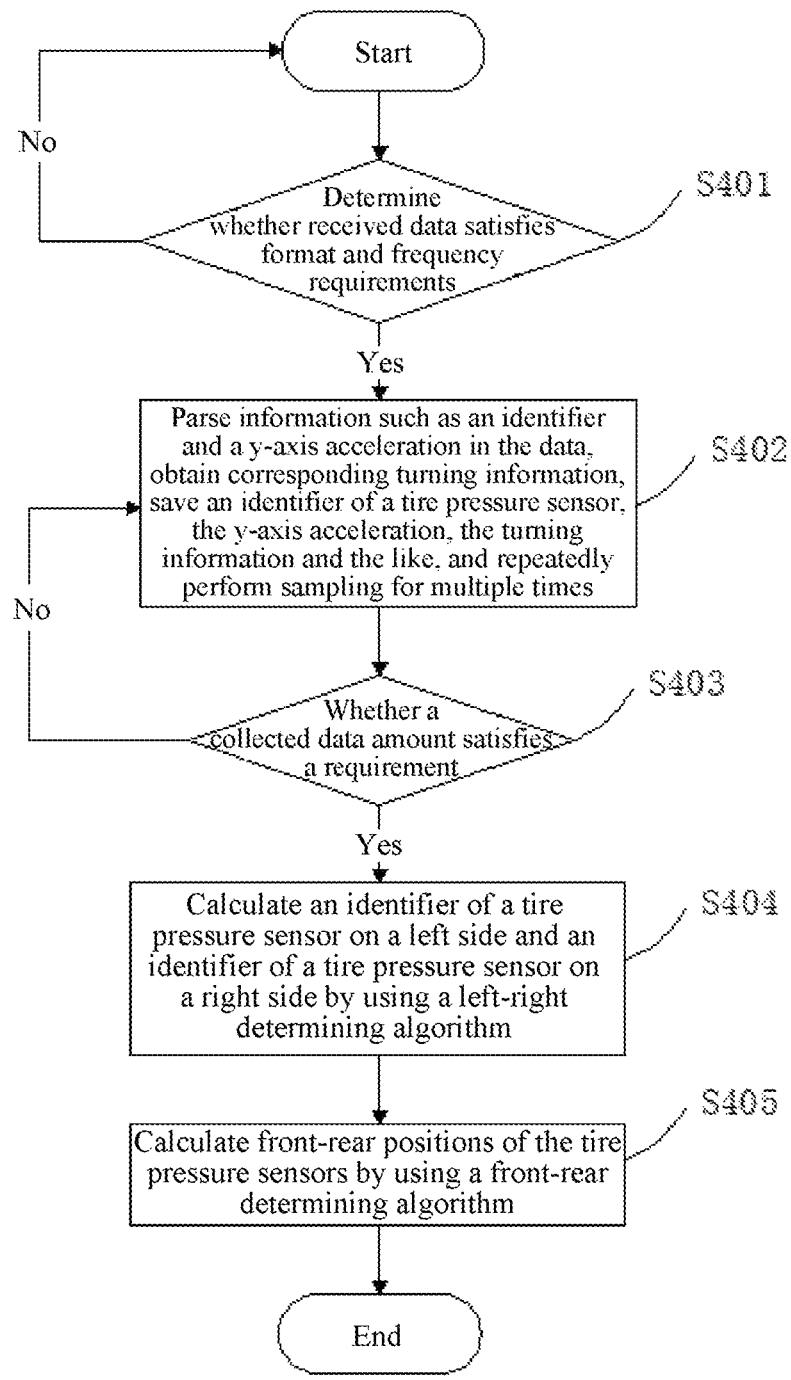
FIG. 9 is a flowchart of a program of a TPMS module of a tire pressure sensor positioning system according to Embodiment 3 of the present application.

As shown in FIG. 9, a program of the TPMS module may include the following procedures:

S401: Determine whether received data satisfies format and frequency requirements, and when the received data satisfies the format and frequency requirements, perform step S402, or when the received data does not satisfy the format and frequency requirements, receive new data.

S402: Parse information such as an identifier (ID) and a y-axis acceleration in the data, obtain corresponding turning information, save an identifier of the tire pressure sensor 11, the y-axis acceleration, the turning information and the like, and repeatedly perform sampling for multiple times.

S403: Determine whether a collected data amount satisfies a requirement, and when the collected data amount satisfies the requirement, perform step S404, or when the collected data amount does not satisfy the requirement, return to step S402.

S404: Calculate an identifier of a tire pressure sensor 11 on a left side and an identifier of a tire pressure sensor 11 on a right side by using a left-right determining algorithm.

S405: Calculate front-rear positions of the tire pressure sensors 11 by using a front-rear determining algorithm.

It should be noted that a sequence of step S404 and step S405 is not limited. That is, the left-right determining algorithm may be adopted first and then the front-rear determining algorithm is adopted, or the front-rear determining algorithm may be adopted first and then the left-right determining algorithm is adopted.

When step S404 is before step S405, that is, when the left-right determining algorithm is adopted first and then the front-rear determining algorithm is adopted, in step S404, determine, according to a positive direction of the y-axis, positive and negative information of the y-axis acceleration and the turning information, whether the tire pressure sensor 11 is located on the left side or the right side of the vehicle. In step S405, when there are at least two tire pressure sensors 11 located on a same side of the vehicle, a tire pressure sensor 11 of the at least two tire pressure sensors 11 that has a larger y-axis acceleration amplitude is in front of a tire pressure sensor 11 of the at least two tire pressure sensors 11 that has a smaller y-axis acceleration amplitude; and when there is a plurality of tire pressure sensors 11 separately located on the left side and the right side of the vehicle, the tire pressure sensors 11 are sorted in descending order of y-axis accelerations, to determine whether a tire pressure sensor 11 having a largest y-axis acceleration is at a right-front position or a left-front position of the vehicle. For details about implementation of sorting the tire pressure sensors 11 in descending order of the y-axis accelerations, refer to descriptions of determining whether a tire pressure sensor 11 is located at a right-front position or a left-front position of a vehicle in Embodiment 1.

When step S405 is before step S404, that is, when the front-rear determining algorithm is adopted first and then the left-right determining algorithm is adopted, in step S401, the received data is y-axis accelerations of tire pressure sensors 11 in tires 12 located on a same side of a vehicle, where there are at least two tire pressure sensors 11. In step S405, front-rear positions of the tire pressure sensors 11 are determined according to y-axis acceleration amplitudes of the tire pressure sensors 11, where a tire pressure sensor 11 having a larger y-axis acceleration amplitude is located in front of a tire pressure sensor 11 having a smaller y-axis acceleration amplitude. In step S404, whether the tire pressure sensors 11 on the same side are located on a left side or a right side of the vehicle is determined according to positive directions of y-axes, positive and negative information of y-axis accelerations and the turning information.

Figure 10:
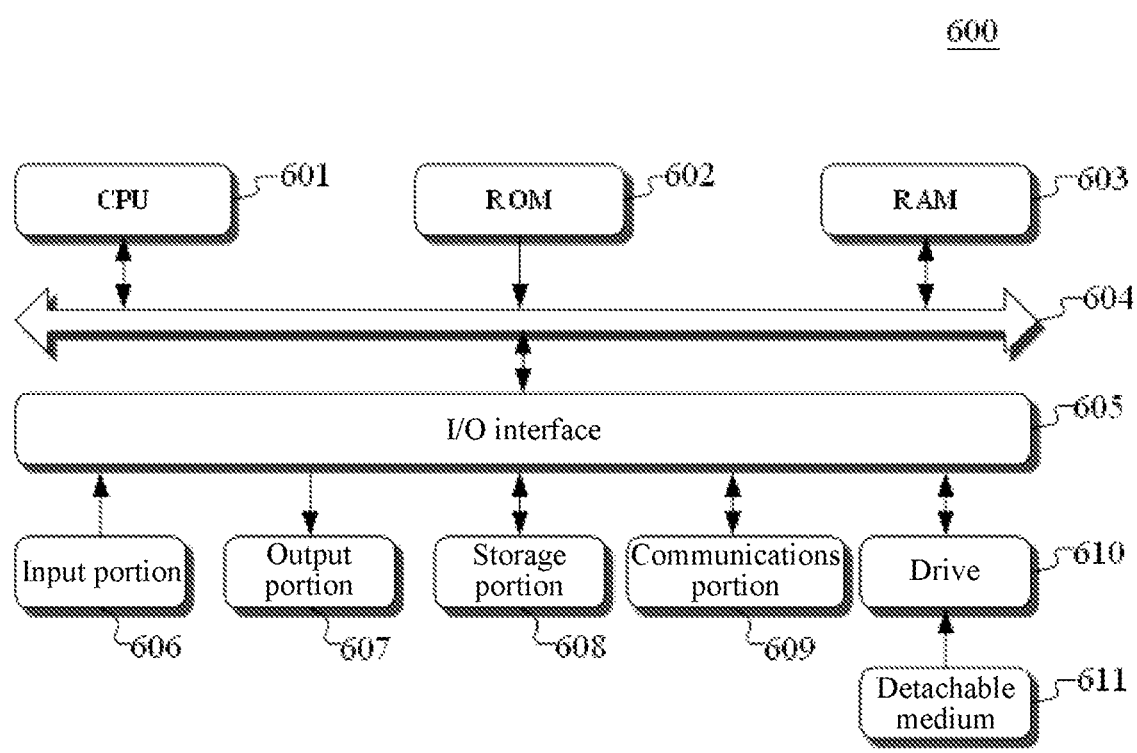
FIG. 10 is a schematic structural diagram of a computer system of a terminal device or a server proper for implementing an embodiment of the present application.

FIG. 10 is a schematic structural diagram of a computer system 600 of a terminal device or a server proper for implementing this embodiment of the present application.

As shown in FIG. 10, the computer system 600 includes a central processing unit (CPU) 601, which may perform various proper actions or processing according to executable instructions stored in a read-only memory (ROM) 602 or executable instructions loaded from a storage portion 608 to a random access memory (RAM) 603. The CPU 601 may further store various programs and data required in an operation of the system 600. The CPU 601, the ROM 602 and the RAM 603 are connected to each other by using a bus 604. An input/output (I/O) interface 605 is also connected to the bus 604.

The following components are connected to the I/O interface 605: an input portion 606 including a keyboard a mouse and the like; an output portion 607 including a cathode ray tube (CRT), a liquid crystal display (LCD), a speaker and the like; a storage portion 608 including a hard disk and the like; and a communications portion 609 of a network interface card including an LAN card, a modem and the like. The communications portion 609 performs communication processing through a network such as the Internet. A drive 610 is also connected to the I/O interface 605 as needed. A detachable medium 611, such as a magnetic disk, an optical disc, a magnetic optical disc or a semiconductor memory, is installed on the drive 610 as needed, so that a computer program read therefrom is installed into a storage portion 608 as needed.

Particularly, according to this embodiment of the disclosure, descriptions of the foregoing reference flowchart may be implemented as a computer software program. For example, this embodiment of the disclosure includes a computer program product, which includes: an instruction of obtaining turning information used to indicate turning of a vehicle; an instruction of obtaining a y-axis acceleration of a tire pressure sensor in a tire of the vehicle, where a y-axis is an axial direction parallel to a wheel bearing; and an instruction of determining a position of the tire pressure sensor according to the turning information and the y-axis acceleration.

For another example, this embodiment of the disclosure includes another computer program product, which includes: an instruction of obtaining y-axis accelerations of tire pressure sensors in tires located on a same side of a vehicle, where there are at least two tire pressure sensors; and an instruction of determining front-rear positions of the tire pressure sensors according to y-axis acceleration amplitudes of the tire pressure sensors, where a tire pressure sensor having a larger y-axis acceleration amplitude is located in front of a tire pressure sensor having a smaller y-axis acceleration amplitude.

In such an embodiment, the computer program may be downloaded and installed from a network by using the communications portion 609 and/or is installed from the detachable medium 611. When the computer program is executed by the CPU 601, the foregoing functions defined in the methods of the present application are executed.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to flowcharts and/or block diagrams of the method, device (system), and the computer program product in the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, the foregoing embodiments are merely examples used for clear descriptions, and are not intended to limit implementations. A person of ordinary skill in the art may further make other different forms of changes or modifications based on the foregoing descriptions. The implementations do not need to and cannot be listed exhaustively. Any obvious change or modification derived from the present invention shall fall within the protection scope of the present invention.

What is claimed is:

1. A tire pressure sensor positioning method, comprising the following steps:
    obtaining turning information used to indicate turning of a vehicle;
    obtaining a y-axis acceleration of a tire pressure sensor in a tire of the vehicle, wherein a y-axis is an axial direction parallel to a wheel bearing; and
    determining a position of the tire pressure sensor according to the turning information and the y-axis acceleration;
    wherein there are at least two tire pressure sensors located on a same side of the vehicle; and
    the step of determining a position of the tire pressure sensor according to the turning information and the y-axis acceleration comprises:
    determining front-rear positions of the at least two tire pressure sensors according to y-axis acceleration amplitudes of the at least two tire pressure sensors, wherein a tire pressure sensor of the at least two tire pressure sensors that has a larger y-axis acceleration amplitude is located in front of a tire pressure sensor of the at least two tire pressure sensors that has a smaller y-axis acceleration amplitude;
    wherein the step of determining a position of the tire pressure sensor according to the turning information and the y-axis acceleration comprises:
    when the turning information is turning left and a positive direction of y-axis acceleration is a direction facing toward an outer side of the tire, or when the turning information is turning right and a positive direction of the y-axis acceleration is a direction facing toward an inner side of the tire, sorting tire pressure sensors in descending order of y-axis accelerations along a clockwise direction, wherein a tire pressure sensor having a largest y-axis acceleration is located at a right-front position of the vehicle; and
    when the turning information is turning right and a positive direction of the y-axis acceleration is a direction facing toward an outer side of the tire, or when the turning information is turning left and a positive direction of the y-axis acceleration is a direction facing toward an inner side of the tire, sorting tire pressure sensors in descending order of y-axis accelerations along an anti-clockwise direction, wherein a tire pressure sensor having a largest y-axis acceleration is located at a left-front position of the vehicle.

2. A tire pressure sensor positioning method, comprising the following steps:
    obtaining y-axis accelerations of tire pressure sensors in tires located on a same side of a vehicle, wherein there are at least two tire pressure sensors; and
    determining front-rear positions of the tire pressure sensors according to y-axis acceleration amplitudes of the tire pressure sensors, wherein a tire pressure sensor having a larger y-axis acceleration amplitude is located in front of a tire pressure sensor having a smaller y-axis acceleration amplitude.

3. The tire pressure sensor positioning method according to claim 2, further comprising:
    obtaining turning information used to indicate turning of a vehicle;
    determining, according to positive directions of y-axes, positive and negative information of y-axis accelerations and the turning information, whether the tire pressure sensors on the same side are located on a left side or a right side of the vehicle.

4. The tire pressure sensor positioning method according to claim 3, wherein the positive directions of the y-axes are directions facing toward outer sides of the tires; and
    the step of determining, according to positive directions of y-axes, positive and negative information of y-axis accelerations and the turning information, whether the tire pressure sensors are located on a left side or a right side of the vehicle comprises:
    when the turning information is turning left and the y-axis accelerations are positive, determining that the tire pressure sensors are located on the right side of the vehicle;
    when the turning information is turning left and the y-axis accelerations are negative, determining that the tire pressure sensors are located on the left side of the vehicle;
    when the turning information is turning right and the y-axis accelerations are positive, determining that the tire pressure sensors are located on the left side of the vehicle; and
    when the turning information is turning left and the y-axis accelerations are negative, determining that the tire pressure sensors are located on the right side of the vehicle.

5. The tire pressure sensor positioning method according to claim 3, wherein the positive directions of the y-axes are directions facing toward inner sides of the tires; and
    the step of determining, according to positive directions of y-axes, positive and negative information of y-axis accelerations and the turning information, whether the tire pressure sensors are located on a left side or a right side of the vehicle comprises:
    when the turning information is turning left and the y-axis accelerations are positive, determining that the tire pressure sensors are located on the left side of the vehicle;
    when the turning information is turning left and the y-axis accelerations are negative, determining that the tire pressure sensors are located on the right side of the vehicle;

when the turning information is turning right and the y-axis accelerations are positive, determining that the tire pressure sensors are located on the right side of the vehicle; and when the turning information is turning right and the y-axis accelerations are negative, determining that the tire pressure sensors are located on the left side of the vehicle.

6. A tire pressure sensor positioning apparatus, comprising:
   a turning information obtaining unit, configured to obtain turning information used to indicate turning of a vehicle;
   a first acceleration obtaining unit, configured to obtain a y-axis acceleration of a tire pressure sensor in a tire of the vehicle, wherein a y-axis is an axial direction parallel to a wheel bearing; and
   a position determining unit, configured to determine a position of the tire pressure sensor according to the turning information and the y-axis acceleration, wherein the positioning determining unit comprises:
   a left-right position determining subunit, configured to determine, according to a positive direction of the y-axis, positive and negative information of the y-axis acceleration and the turning information, whether the tire pressure sensor is located on a left side or a right side of the vehicle, wherein the positive direction of the y-axis is a direction facing toward an outer side of the tire; and the left-right position determining subunit comprises:
   a first determining subunit, configured to: when the turning information is turning left and the y-axis acceleration is positive, determine that the tire pressure sensor is located on the right side of the vehicle;
   a second determining subunit, configured to: when the turning information is turning left and the y-axis acceleration is negative, determine that the tire pressure sensor is located on the left side of the vehicle;
   a third determining subunit, configured to: when the turning information is turning right and the y-axis acceleration is positive, determine that the tire pressure sensor is located on the left side of the vehicle; and
   a fourth determining subunit, configured to: when the turning information is turning left and the y-axis acceleration is negative, determine that the tire pressure sensor is located on the right side of the vehicle.

7. The tire pressure sensor positioning apparatus according to claim 6, wherein the positive direction of the y-axis is a direction facing toward an inner side of the tire; and the left-right position determining subunit comprises:
   a fifth determining subunit, configured to: when the turning information is turning left and the y-axis acceleration is positive, determines that the tire pressure sensor is located on the left side of the vehicle;
   a sixth determining subunit, configured to: when the turning information is turning left and the y-axis acceleration is negative, determine that the tire pressure sensor is located on the right side of the vehicle;
   a seventh determining subunit, configured to: when the turning information is turning right and the y-axis acceleration is positive, determine that the tire pressure sensor is located on the right side of the vehicle; and
   an eighth determining subunit, configured to: when the turning information is turning right and the y-axis acceleration is negative, determine that the tire pressure sensor is located on the left side of the vehicle.

8. The tire pressure sensor positioning apparatus according to claim 6, wherein there are at least two tire pressure sensors located on a same side of the vehicle; and
   the positioning determining unit comprises:
   a first front-rear position determining subunit, configured to determine front-rear positions of the at least two tire pressure sensors according to y-axis acceleration amplitudes of the at least two tire pressure sensors, wherein a tire pressure sensor of the at least two tire pressure sensors that has a larger y-axis acceleration amplitude is located in front of a tire pressure sensor of the at least two tire pressure sensors that has a smaller y-axis acceleration amplitude.

9. The tire pressure sensor positioning apparatus according to claim 6, wherein the positioning determining unit comprises:
   a right-front position determining subunit, configured to: when the turning information is turning left and a positive direction of the y-axis acceleration is a direction facing toward an outer side of the tire, or when the turning information is turning right and a positive direction of the y-axis acceleration is a direction facing toward an inner side of the tire, sort tire pressure sensors in descending order of y-axis accelerations along a clockwise direction, wherein the right-front position determining subunit determines that a tire pressure sensor having a largest y-axis acceleration is located at a right-front position of the vehicle; and
   a left-front position determining subunit, configured to: when the turning information is turning right and a positive direction of the y-axis acceleration is a direction facing toward an outer side of the tire, or when the turning information is turning left and a positive direction of the y-axis acceleration is a direction facing toward an inner side of the tire, sort tire pressure sensors in descending order of y-axis accelerations along an anti-clockwise direction, wherein the left-front position determining unit determines that a tire pressure sensor having a largest y-axis acceleration is located at a left-front position of the vehicle.

10. A tire pressure sensor positioning apparatus, comprising:
    a second acceleration obtaining unit, configured to obtain y-axis accelerations of tire pressure sensors in tires located on a same side of a vehicle, wherein there are at least two tire pressure sensors; and
    a second front-rear position determining unit, configured to determine front-rear positions of the tire pressure sensors according to y-axis acceleration amplitudes of the tire pressure sensors, wherein a tire pressure sensor having a larger y-axis acceleration amplitude is located in front of a tire pressure sensor having a smaller y-axis acceleration amplitude.

11. The tire pressure sensor positioning apparatus according to claim 10, further comprising:
    a turning information obtaining unit, configured to obtain turning information used to indicate turning of a vehicle; and
    a left-right position determining unit, configured to determine, according to positive directions of y-axes, positive and negative information of the y-axis accelerations and the turning information, whether the tire pressure sensors on the same side are located on a left side or a right side of the vehicle.

12. The tire pressure sensor positioning apparatus according to claim 11, wherein the positive directions of the y-axes are directions facing toward outer sides of the tires; and the left-right position determining unit comprises:

a first determining subunit, configured to: when the turning information is turning left and the y-axis accelerations are positive, determine that the tire pressure sensors are located on the right side of the vehicle;

a second determining subunit, configured to: when the turning information is turning left and the y-axis accelerations are negative, determine that the tire pressure sensors are located on the left side of the vehicle;

a third determining subunit, configured to: when the turning information is turning right and the y-axis accelerations are positive, determine that the tire pressure sensors are located on the left side of the vehicle; and a fourth determining subunit, configured to: when the turning information is turning right and the y-axis accelerations are negative, determine that the tire pressure sensors are located on the right side of the vehicle.

13. The tire pressure sensor positioning apparatus according to claim 11, the positive directions of the y-axes are directions facing toward inner sides of the tires; and the left-right position determining unit comprises:

a fifth determining subunit, configured to: when the turning information is turning left and the y-axis accelerations are positive, determine that the tire pressure sensors are located on the left side of the vehicle;

a sixth determining subunit, configured to: when the turning information is turning left and y-axis accelerations are negative, determine that the tire pressure sensors are located on the right side of the vehicle;

a seventh determining subunit, configured to: when the turning information is turning right and the y-axis accelerations are positive, determine that the tire pressure sensors are located on the right side of the vehicle; and an eighth determining subunit, configured to: when the turning information is turning right and the y-axis accelerations are negative, determine that the tire pressure sensors are located on the left side of the vehicle.

* * * * *